May 11, 1943. L. D. HOLMES 2,318,995
VEHICLE WASHING APPARATUS
Filed Feb. 6, 1941 2 Sheets-Sheet 1
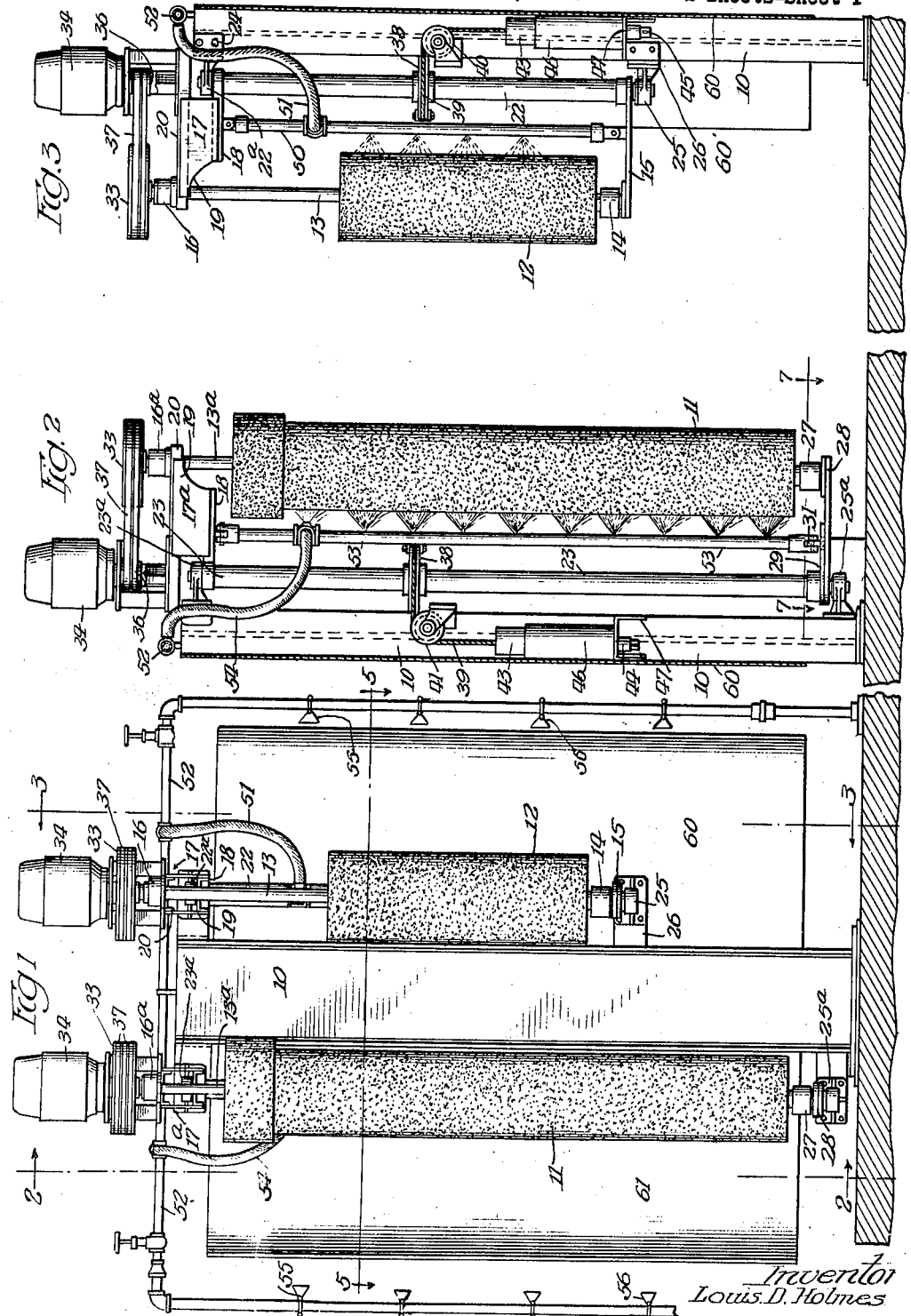
Inventor
Louis D. Holmes May 11, 1943. L. D. HOLMES 2,318,995
VEHICLE WASHING APPARATUS
Filed Feb. 6, 1941 2 Sheets-Sheet 2
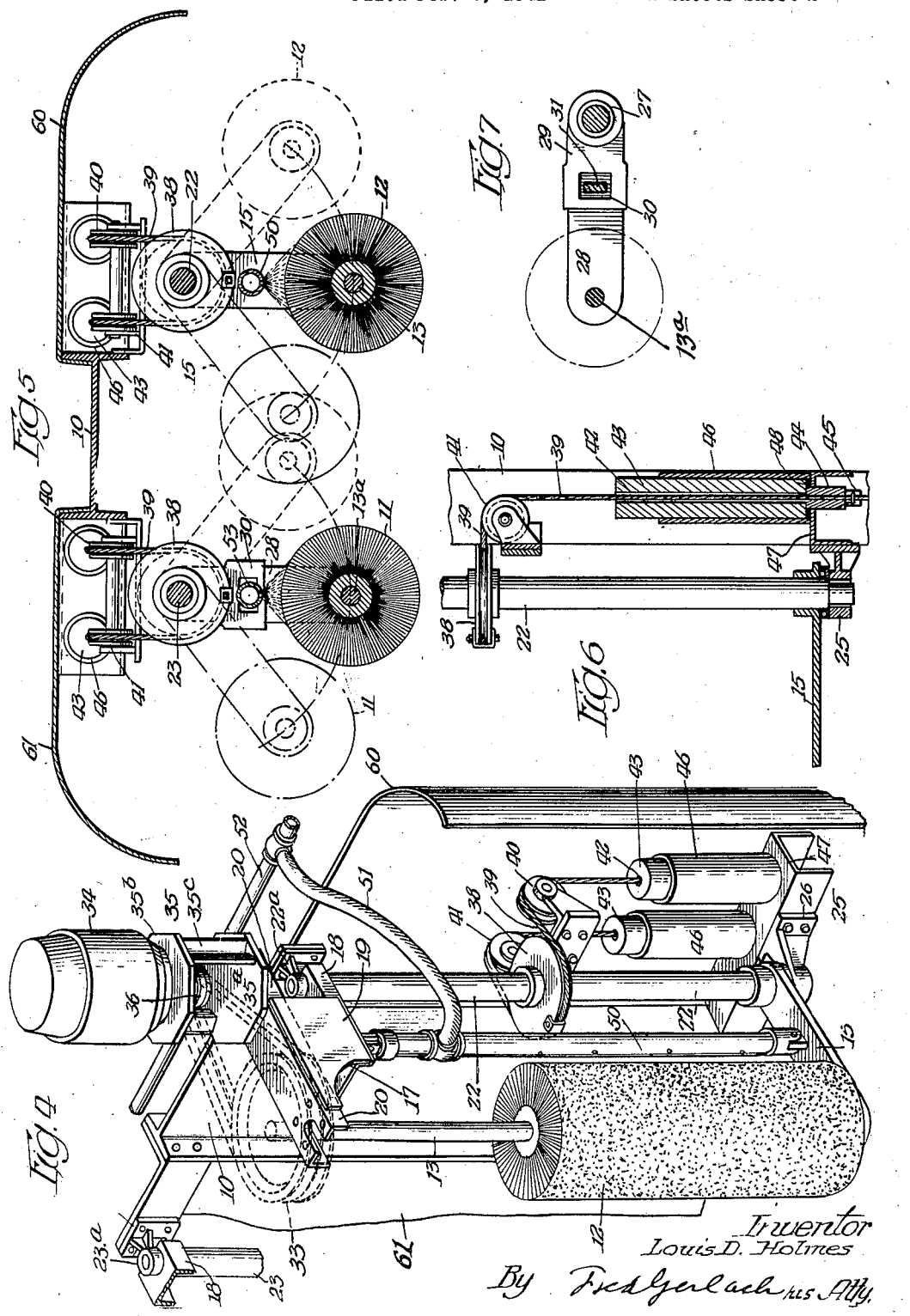
Inventor
Louis D. Holmes
By Fred Gerlach his Atty.

Patented May 11, 1943

2,318,995

UNITED STATES PATENT OFFICE 2,318,995

VEHICLE WASHING APPARATUS

Louis D. Holmes, Harvey, Ill., assignor to Whiting Corporation, Harvey, Ill., a corporation of Illinois Application February 6, 1941, Serial No. 377,651

6 Claims. (Cl. 15—53)

The invention relates to apparatus for washing vehicles and, more particularly, to that type of apparatus which is designed to wash railway cars or busses while the vehicles are moved past, and engage, motor-driven vertical rotary brushes at one or both sides of the vehicle.

One object of the invention is to provide car-washing apparatus which comprises one or more vertical brushes mounted to swing horizontally and yieldable for engagement with the side of the car as it travels past the brushes so that the apparatus is inherently or automatically adapted to wash cars moving in either direction. This object is attained primarily by providing a horizontally swinging support for each brush which is normally held in a centralized position so that it can be deflected in opposite directions by a car as it travels past the brushes in either direction, and means for automatically swinging the brush-supporting arms to their centralized position and pressing the brush against the side of the car when it is deflected in either direction by the moving car or vehicle.

Another object of the invention is to provide a car-washing apparatus of this type in which the brushes are shifted to their centralized position by weights.

Other objects of the invention will appear from the detailed description.

The invention consists in the several novel features which are hereinafter set forth and are more particularly defined by claims at the conclusion hereof.

In the drawings: Fig. 1 is a front elevation of a washing unit comprising a pair of brushes for washing one side of a car. Fig. 2 is a section taken on line 2—2 of Fig. 1. Fig. 3 is a section taken on line 3—3 of Fig. 2. Fig. 4 is a perspective of one of the brushes, its driving mechanism, and the means for shifting the brush-supporting arms to their centralized position and pressing the brush against the side of the car. Fig. 5 is a horizontal section taken on line 5—5 of Fig. 2. Fig. 6 is a vertical section through one of the counterweights for swinging one of the brushes. Fig. 7 is a section taken on line 7—7 of Fig. 2.

In practice, the equipment usually comprises two similar units which are disposed at the sides of a driveway or track for simultaneously washing the opposite sides of a vehicle, as well understood in the art. These units are alike in construction, so that only one is illustrated and described.

Each washing unit comprises a central upright I-beam which constitutes a supporting mast 10, a vertical rotary brush 11 of sufficient height to traverse and wash the entire side of the car, and a shorter vertical rotary brush 12 for washing the windows of the car. The shaft 13 of brush 12 is journaled at its lower end in a suitable bearing 14 which is carried by a horizontally movable arm 15 and at its upper end in a bearing 16 which is supported on an arm 17 which is vertically aligned with arm 15. Arms 15 and 17 are rigidly secured to a pivot-rod or shaft 22. Said shaft is journaled at its upper end in a bearing 23a which is rigidly connected by a bracket 24 to the mast 10 and at its lower end in a bearing 25 which is fixedly supported from said mast. Rod 22 and arms 15 and 17 constitute a vertical horizontally swinging support which carries the rotary brush 12 so that it will be normally positioned in the path of the car and will be deflected thereby as the vehicle travels past the brush in either direction. The shaft 13a of rotary brush 11 is journaled at its upper end in a bearing 16 on an arm 17a and its lower end in a bearing 27 which is carried by an arm 28. Arm 17a for supporting brush 11 is fixed to a pivot-shaft 23. Arm 28 which carries the lower bearing 27 for said shaft has a limited pivotal movement on shaft 23 and is connected to said shaft by an arm 29 which is fixed to said shaft and is provided with a slot 30 into which a lug 31 on arm 28 extends. This permits a limited vertical tilt of brush 11 so that it will align itself to the car-side regardless of whether the car is vertical or inclined towards or away from the mast. Shaft 23 is journaled at its upper end in a bearing 16a and at its lower end in a bearing 25a which are supported by brackets from one side of the mast 10, similar to those which support shaft 22. Each of the upper brush-supporting arms 17, 17a is built up of a lower channel-beam 18 which is fixed to one of the pivot-shafts, side-plates 19 fixed to the sides of beam 18, and an upper channel-beam 20.

Electric motors 34 are mounted on brackets 25 on arms 17, 17a for individually driving the brushes 11, 12. Each bracket 35 comprises a lower plate 35a welded to a beam 20, an upper plate 35b and vertically extending plates 35c which are welded to plates 35a, 35b. A belt-pulley 33 is fixed to the upper end of each of the shafts 13, 13a of the brushes 11 and 12, respectively. A drive-pulley 36 is fixed to the lower end of the shaft of each electric motor 34 below the upper plate 35b of brackets 35, and is connected to drive belt-pulley 33 by means of belts 37. Preferably, the shafts of motors 34 are coaxial with the pivot-shafts to which arms 17, 17ᵃ are respectively secured so that said arms can swing horizontally without bodily movement of the motors.

The supporting-arms for the brushes are normally centralized or extend inwardly at right angles to the track for, or path of travel of, the vehicle and are free to swing angularly in opposite directions from their centralized position, as indicated by dotted lines in Fig. 4. Each of the brushes is normally and yieldingly held in its centralized position by devices which are applied to press the supporting-arms into their centralized positions and cause the brushes, while revolving and deflected by the vehicle, to engage the side of and wash the vehicle. Each of these centering devices comprises a sheave 38 fixed to one of the pivot-shafts 22, 23. A cable 39 is looped around and centrally fixed to the sheave, with branches which extend backwardly around guide-sheaves 40, 41, and thence downwardly through an opening 42 in a counterweight 43 of sufficient force to shift one of the brushes and its supporting means. The lower end of each of the vertical branches of cable 39 has fixed thereto a clamp 45. A small weight 44 on the lower end of the weight 43 is adapted to engage and lift and to be lowered away from the associated counterweight 43. Each weight 43 is guided in a cylinder 46 which is fixedly supported to a bracket 47 which is secured to one of the end-faces of the mast 10. When the supporting-arms for the brushes are in centralized position, both weights will be stationarily supported and, upon deflection of a brush by the car, one end of cable 39 will lift one of the weights 43, while the other end of the cable will be paid out and held taut by the small weight 44 thereon without lifting the other weight 43. A rubber cushion 48 is provided in the bottom of cylinder 46 for weight 43.

A spray-pipe 50 extends vertically between and is carried by arms 15 and 17 which support and swing laterally with brush 12 for discharging jets of water onto the brush 12 while it is being driven for washing the vehicle. A flexible pipe-section 51 supplies water to jet-pipe 50 from a supply-pipe 52. A vertical spray-pipe 53 has its upper end supported by arm 29 and its lower end is connected to lug 31 on arm 28, so that said pipe will swing laterally with brush 11 and is adapted to discharge jets of water onto said brush. A flexible pipe 54 supplies water to jet-pipe 53 from supply-pipe 52. Vertical jet-pipes 55 and 56 are adapted to jet streams of water on the side of the car or vehicle as it is approaching and after being washed by the brushes. Spray-shields 60 and 61 are secured to the mast to confine the splash from the brushes so it will not be projected outwardly of the mast.

In operation, the brushes 11 and 12 will be normally held in their centralized position by their supporting-arms and will be driven by motors 34, respectively. The car to be washed will be moved to travel past the washing unit. As the vehicle reaches the brushes it will deflect them in the direction of the travel of the vehicle and one of each pair of weights 43 will be lifted by one end of a cable 39, and its force applied to press the brush-supporting arms so as to keep the brushes pressed against the side of the vehicle. When the vehicle is traveling to the right, as viewed in Fig. 4, the supporting-arms for the brushes will be deflected to the right and the brushes will be pressed against the side of the car while the brushes are being driven by their respective motors. The deflection of the supporting-arms to the right will, through the supporting-arms and pivot-shafts for the brushes, respectively, rotate sheaves 38 to take up one end of each cable 39 and lift the left of each pair of weights 43 by means of weights 44 while the other ends of the cables will be kept taut and pass through the right hand weights 43 of each pair by means of the small weights 44. In this manner, both brushes will be pressed against one side of the car as it travels past the washing apparatus, the brush 12 serving to wash the car-windows and the brush 11 one side of the car. After the car clears the brushes the weights 44 which have been lifted, will act on their associated weights 48, respectively, and return the supporting-arms and the brushes to their centralized positions. When a vehicle is traveling to the left it will, as it encounters the brushes, swing them and their supporting-arms to the left and the right-hand weight 43 of each pair will be lifted by right-hand weights 44 and cable 39 while the left-hand weights 43 will remain stationary and the associated small weights 44 will keep taut the end of the branches of the cable which are paid out by sheaves 38. During the travel of the vehicle past the brushes, motors 34 will be driven to keep the brushes in rotation and water will be sprayed onto the brushes by pipes 50, 53 and onto the side of the car by spray-pipes 55 and 56.

The invention exemplifies vehicle-washing apparatus in which the rotary brushes are normally held in a centralized position and are shiftable in either direction by the vehicle and in which the brushes are pressed against the side of the vehicle while deflected in either direction from their centralized positions. This makes it possible to wash cars which are traveling in either direction past the washing-means without changing the setting of the brushes or their operative connections. By using weights, a uniform pressure of the brushes is maintained against the side of the car throughout the varying deflections caused by variations in the widths of the vehicles or irregularities in the size.

The invention is not to be understood as restricted to the details set forth, since these may be modified within the scope of the appended claims, without departing from the spirit and scope of the invention.

Having thus described the invention, what I claim as new and desire to secure by Letters Patent is:

1. In washing-apparatus for vehicles, the combination of a supporting-structure, a vertically extending motor-driven rotary brush adapted to engage the side of a vehicle, brush-supporting means pivotally supported from the structure to swing horizontally from a normally centralized position and adapted to be deflected in opposite directions by the vehicle, and means, comprising weights, for normally and yieldingly holding the supporting-means and brush in their centralized position and pressing the brush against the vehicle for washing when deflected in either of said opposite directions by the movement of the vehicle past and against the brush, said weights being adapted to automatically retract the brush to normal position when released by the vehicle.

2. In washing-apparatus for vehicles, the combination of a supporting-structure, a vertically extending motor-driven rotary brush adapted to engage the side of a vehicle, brush-supporting means pivotally supported from the structure to swing horizontally from a normally centralized position and adapted to be deflected in opposite directions by the vehicle, and means, comprising a pair of weights and a cable, connected to the supporting-means, for normally and yieldingly holding the supporting-means and brush in their centralized position and pressing the brush against the vehicle for washing when deflected in either of said opposite directions by the movement of the vehicle past and against the brush, said weights being adapted to automatically retract the brush to normal position when released by the vehicle.

3. In washing-apparatus for vehicles, the combination of a supporting-structure, a vertically extending motor-driven rotary brush adapted to engage the side of a vehicle, brush-supporting means pivotally supported from the structure to swing horizontally from a normally centralized position and adapted to be deflected in opposite directions by the vehicle, and means, comprising a sheave connected to the supporting-means, a cable connected to the sheave and a pair of weights shiftable by the ends of the cable, respectively, for normally and yieldingly holding the supporting-means and brush in their centralized position and pressing the brush against the vehicle for washing when deflected in either of said opposite directions by the movement of the vehicle past and against the brush, said weights being adapted to automatically retract the brush to normal position when released by the vehicle.

4. In washing-apparatus for vehicles, the combination of a supporting-structure, a vertically extending motor-driven rotary brush adapted to engage the side of a vehicle, brush-supporting means pivotally supported on the structure to swing horizontally from a normally centralized position and adapted to be deflected in opposite directions by the vehicle, means for normally and yieldingly holding the supporting-means and brush in their centralized position and pressing the brush against the vehicle for washing when deflected in either of said opposite directions by the movement of the vehicle past and against the brush, said holding-means comprising a pair of weights for moving the supporting-means in opposite directions, means for stationarily supporting the weights, and a cable connected to swing the supporting-means and having its ends connected to alternately shift one of the weights and leave the other stationary when the brush is shifted from its centralized position in opposite directions.

5. In washing-apparatus for vehicles, the combination of a supporting-structure, a vertically extending motor-driven rotary brush adapted to engage the side of a vehicle, brush-supporting means comprising a shaft and pivotally supported on the structure to swing horizontally from a normally centralized position and adapted to be deflected in opposite directions by the vehicle, means for normally and yieldingly holding the supporting-means and brush in their centralized position and pressing the brush against the vehicle for washing when deflected in either of said opposite directions by the movement of the vehicle past and against the brush, said holding-means comprising a pair of weights for moving the supporting-means in opposite directions, means for stationarily supporting the weights, a sheave fixed to the shaft, a cable connected to the sheave and having its ends connected to alternately shift one of the weights and leave the other stationary when the brush is shifted from its centralized position in opposite directions.

6. In washing-apparatus for vehicles, the combination of a supporting-structure, a vertically extending motor-driven rotary brush adapted to engage the side of a vehicle, brush-supporting means pivotally supported from the structure to swing horizontally from a normally centralized position and adapted to be deflected in opposite directions by the vehicle, means for normally and yieldingly holding the supporting-means and brush in their centralized position and pressing the brush against the vehicle for washing when deflected in either of said opposite directions by the movement of the vehicle past and against the brush, said holding and pressing-means comprising a pair of weights, means for stationarily supporting the weights, a cable connected to shift the supporting-means and having its ends extended through the weights, and members connected thereto adapted to engage the weights, the members being alternately adapted to lift one of the weights and keep the free end of the cable taut, when the supporting-means is swung in opposite directions from its centralized position.

LOUIS D. HOLMES.